June 22, 1926.
W. C. KRAUSE
WATER POWER TRANSFERABLE HYDROELECTRIC PLANT
Original Filed July 30, 1920   2 Sheets-Sheet 1
1,589,403
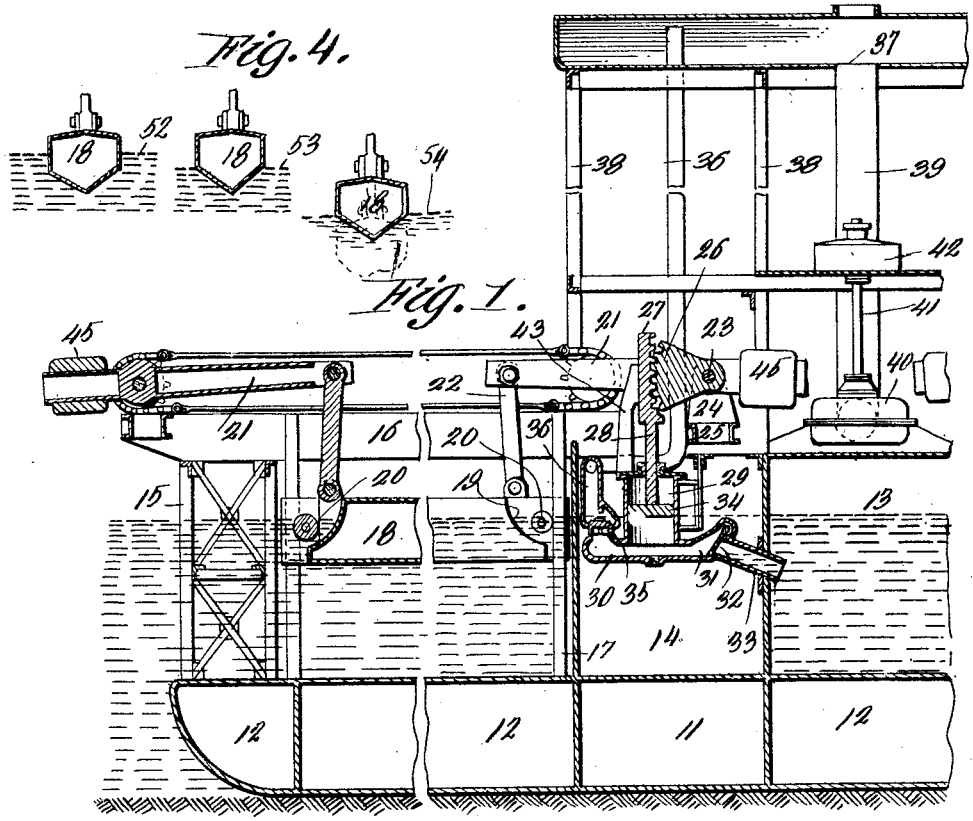
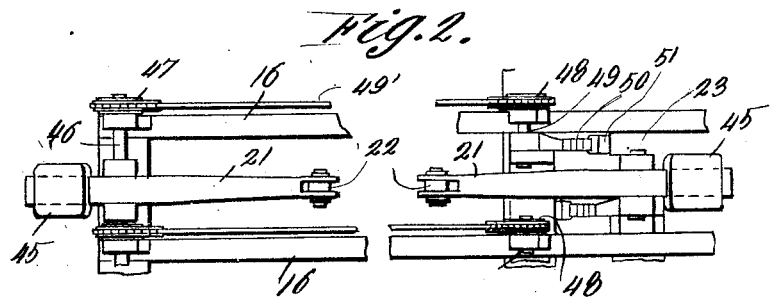
WITNESSES
WILLIAM CARL KRAUSE INVENTOR.
BY
ATTORNEY.

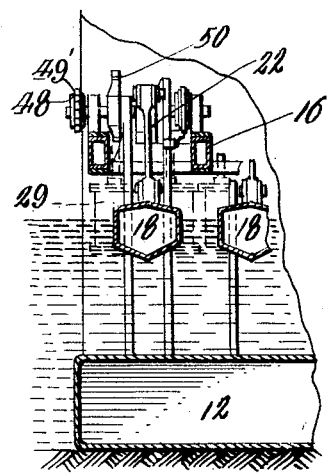
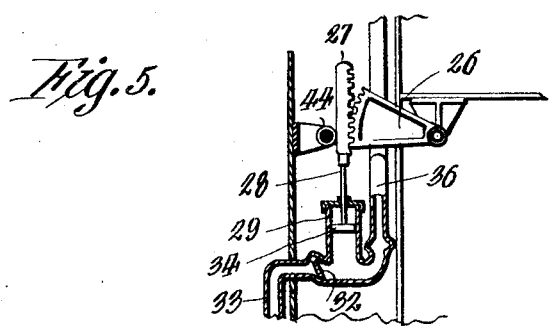
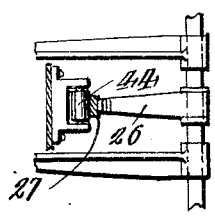

Patented June 22, 1926.

1,589,403

UNITED STATES PATENT OFFICE.

WILLIAM CARL KRAUSE, OF SAN FRANCISCO, CALIFORNIA.

WATER-POWER TRANSFERABLE HYDROELECTRIC PLANT.

Application filed July 30, 1920, Serial No. 400,002. Renewed January 30, 1926.

This invention relates to new and useful improvements in wave motors and this application is a continuation in part of my co-pending application for water power transferable hydroelectric plants, S. N. 286,356, filed March 31st, 1919.

The primary object of the invention is to provide means for conveying water to desired places.

Another object of the invention is to provide a device of the above nature which may be floated from place to place and submerged when the device is to be put into operation.

An important object of the invention is to provide a device of the above nature comprising means for conveying water to a high level whereby the same may be conveyed under pressure to a suitable mechanism for deriving power therefrom and is especially designed for generating electricity.

Still another object of the invention is to provide means for operating several independent pumping mechanisms with a single float.

Another object of the invention is to provide a novel arrangement whereby the float will properly be directed to the wave's crest and will move the maximum distance to effect the maximum stroke of the pump piston.

Other objects and advantages of the invention will become apparent during the course of the following description.

In the accompanying drawings forming a part of the application and wherein like numerals are employed to designate like parts throughout the several views:

Figure 1 is a longitudinal section through the invention.

Figure 2 is a fragmentary top plan of a portion thereof.

Fig. 3 is a fragmentary transverse section through the device.

Figure 4 are transverse sections through the float illustrating various positions thereof.

Figure 5 is a section of a modified form of pumping mechanism, and

Figure 6 is a top plan of the same.

Referring to the drawings wherein for the purpose of illustration are shown the preferred embodiments of the invention, the numeral 11 designates a buoyant submergible base consisting of a plurality of compartments 12 which may be filled with water for submerging the base or may be rendered air tight by suitable pumping mechanism so that the base will be rendered buoyant whereby the entire device may be floated upon the surface of the water for repairs or be conveyed to a different location. Both sides of the device are identical, and therefore, only one side has been illustrated and a description thereof will suffice for both.

On each side of the open water passage 13, I provide a compartment 14 into which no water is permitted to enter. Rising from the end of the base 11 is a pile structure 15 which supports the outer end of spaced parallel horizontal piers 16, while the opposite ends of the piers are suitably supported upon the base. Between the pile structure 15 and the compartment 14, upstanding guides 17 rise from the base 11 and are connected at their upper ends to the piers. A pair of guides 17 are provided for each end of a float 18, which may consist of a tank of any suitable material. The corners of the float are cut away as at 19 whereby the guides may properly engage the float to cause the same to move vertically. Anti-friction rollers 20 are provided at the cut out portions for engagement with the guides so as to reduce as far as possible the friction which might occur between the float and the guides. It is to be understood that as many floats as are desired may be employed without departing from the scope of the invention, and that these floats are arranged side by side in slightly spaced relation whereby the floats will operate one after the other.

A pair of oppositely disposed levers 21 are fulcrumed between each pair of piers 16, their inner ends being connected to the float 18 by means of depending links 22. The opposite end of the relative innermost lever 21 is fulcrumed by being secured to a shaft 23 which is suitably mounted in bearings 24 carried by beams 25 forming a part of the structural work of the base. A gear segment 26 is keyed to the shaft 23 and is adapted for cooperation with a vertical rack 27 carried by a pump piston rod 28.

The pump mechanism is mounted within the compartment 14, and part of the mechanism is disposed below the level of the water. The pump cylinder 29 is suitably supported and its lower end is provided with a discharge opening 30 and an inlet opening 31, the latter being controlled by a check valve 32. A pipe extends from the inlet opening through a partition of the compartment 14 and its inlet end is disposed below the level of the water so that water will automatically rush into the pump cylinder when the piston 34 carried by the rod 28 begins to move toward the upper end of the cylinder. A check valve 35 is provided in a conduit or pipe 36 which leads from the discharge opening 30. This conduit 36 extends vertically of the base to a point a substantial distance above the level of the water where it empties into a tank 37. This tank is supported by suitable beams 38 and has its outlet into a vertical centrally extending conduit or pipe 39. The lower end of the conduit 39 enters into a water turbine 40 to discharge water thereinto and thereby cause rotation of a rotor shaft extending vertically into an electric current generator 42. The electric current from this generator may be led by suitable conductors to the shore or any other suitable place.

An upstanding guide 43 rises from the pump cylinder to engage the rack portion of the piston rod so that the same may be properly moved by the gear segments 26. In place of the upstanding guide 43, a roller 44 as shown in Figure 9 may be suitably mounted upon the base to engage the rear edge of the rack bar.

A weight 45 is provided upon one end of each lever adjacent its fulcrum point to assist in elevating the float from the trough of the wave to meet the crest of the next wave. The relative outer end of the outermost lever 21 is secured to a shaft 46 which is suitably mounted upon the piers 16. This shaft extends beyond the side of the lever and is provided with sprocket wheels 47. Similar sprocket wheels 48 are mounted upon opposite sides of the coacting lever 21 and flexible elements 49' engage the pairs of sprocket wheels 47 and 48 so that movement of the shafts 46 will be transmitted to stub shafts 49 upon which the sprocket wheels are mounted. These stub shafts are suitably supported upon the piers 16 and each is provided with a gear segment 50 adapted for cooperation with the rack portion 51 of piston rods forming parts of other pump cylinders, as clearly seen in Figure 2. From the foregoing, it will be obvious that each two levers 21 operate two independent pumps.

By referring to Figures 1 and 4, the numeral 52 designates the crest of a wave and the relative position of the float 18. It is to be understood that due to the arrangement, when the wave begins to descend, the float is held suspended for a short interval whereby the float may fall independently of the wave. The numeral 53 designates an intermediate position of the descending wave while the numeral 54 indicates the trough of the wave showing the float 18 in dotted lines, submerged by its descending inertia and the weight of the levers 21. After the float has been submerged, it will then float to the position shown in full lines in the trough of the wave. Upon the rise of a wave, the float will move upwardly and cause the rise of the piston 34 and the opening of the check valve 32 whereby water will be permitted to enter through the inlet 31 and into the pump cylinder. This upward movement of the piston causes the closing of the check valve in the conduit leading from the pump cylinder to the tank 37 and upon downward movement of the float the piston will be moved downwardly within the cylinder thereby causing closing of the valve 32 and opening of the valve in the conduit 36. It will therefore be obvious that the water in the pump cylinder will be forced through the conduit 36 and then into the tank 37. During these operations, the outermost lever 21 will of course cause movement of the shaft 46 whereby the stub shaft 49 will be caused to rock and actuate the pistons of other pumps as before set forth. As the tank 37 will be continually filled, water therefrom will be pumped out through the pipe 39 into the turbine 40 to cause rotation of the shaft 41 and consequently the generation of electricity in the generator 42.

The foregoing description and the drawings have reference to the preferred embodiment of my invention. It is to be understood however that such changes may be made in construction and arrangement of parts, materials, etc., as may prove expedient and fall within the scope of the appended claims.

Having thus fully described my invention what I claim as new and desire to secure by Letters Patent is:—

1. In a wave motor, a float, a pair of shafts, a lever secured to each shaft and connected to said float, a sprocket secured to one of said shafts, a stub shaft, a sprocket on said stub shaft, a flexible element associated with said sprockets, and a pump mechanism driven by said stub shaft and one of said lever shafts.

2. In a wave motor, a frame work, a float adapted to ride the waves, a pair of lever shafts carried by the frame work, a lever mounted on each shaft and having connection with said float, a pair of stub shafts, sprocket wheels keyed to said stub shafts and a pair of sprocket wheels keyed to one of the lever shafts, flexible elements engaging the sprockets of said lever shaft and the said shafts, an independent pump mechanism actuated by one of the lever shafts and the stub shafts.

In testimony whereof I affix my signature.

WILLIAM CARL KRAUSE.